(12) United States Patent
Kasazumi et al.

(10) Patent No.: US 10,313,666 B2
(45) Date of Patent: Jun. 4, 2019

(54) DISPLAY DEVICE AND DISPLAY METHOD

(71) Applicant: Panasonic Intellectual Property Management Co., Ltd., Osaka (JP)

(72) Inventors: Kenichi Kasazumi, Osaka (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 291 days.

(21) Appl. No.: 15/308,356

(22) PCT Filed: May 8, 2015

(86) PCT No.: PCT/JP2015/002337
§ 371 (c)(1),
(2) Date: Nov. 1, 2016

(87) PCT Pub. No.: WO2015/174050
PCT Pub. Date: Nov. 19, 2015

(65) Prior Publication Data
US 2017/0054973 A1 Feb. 23, 2017

(30) Foreign Application Priority Data
May 12, 2014 (JP) .................................. 2014-098815

(51) Int. Cl.
*H04N 13/398* (2018.01)
*H04N 13/106* (2018.01)
(Continued)

(52) U.S. Cl.
CPC .......... *H04N 13/398* (2018.05); *B60K 35/00* (2013.01); *B60R 1/00* (2013.01); *B60R 16/02* (2013.01);
(Continued)

(58) Field of Classification Search
CPC ..................................................... H04N 13/398
See application file for complete search history.

(56) References Cited

U.S. PATENT DOCUMENTS

| | | | |
|---|---|---|---|
| 2011/0298693 A1 | 12/2011 | Tasaki et al. | |
| 2012/0268351 A1* | 10/2012 | Sasaki | G01C 21/365 345/8 |

FOREIGN PATENT DOCUMENTS

| | | |
|---|---|---|
| JP | 2005-067515 | 3/2005 |
| JP | 2005-301144 | 10/2005 |

(Continued)

OTHER PUBLICATIONS

International Search Report of PCT application No. PCT/JP2015/002337 dated Jul. 28, 2015.

*Primary Examiner* — James M Pontius
(74) *Attorney, Agent, or Firm* — Greenblum & Bernstein, P.L.C.

(57) ABSTRACT

This display device is provided with a display unit and a control unit. The display unit projects and reflects, onto a light-transmitting display medium, light expressing an image, to allow the image to be viewed, as a virtual image, by a user. The control unit performs first stereoscopic display processing for causing light respectively expressing a left-eye image and a right-eye image of an object to be displayed, to be projected in the display unit. As a result of this processing, the object to be displayed can be stereoscopically viewed in a three-dimensional image space by the user.

9 Claims, 8 Drawing Sheets

(51) Int. Cl.

| | | |
|---|---|---|
| *B60K 35/00* | (2006.01) | |
| *B60R 16/02* | (2006.01) | |
| *G01C 21/36* | (2006.01) | |
| *G02B 27/01* | (2006.01) | |
| *G02B 27/22* | (2018.01) | |
| *G09G 5/36* | (2006.01) | |
| *B60R 1/00* | (2006.01) | |
| *H04N 13/30* | (2018.01) | |

(52) U.S. Cl.
CPC ............. *G01C 21/36* (2013.01); *G02B 27/01* (2013.01); *G02B 27/0101* (2013.01); *G02B 27/22* (2013.01); *G02B 27/2228* (2013.01); *G09G 5/36* (2013.01); *H04N 13/106* (2018.05); *H04N 13/30* (2018.05); *B60K 2350/1072* (2013.01); *B60K 2350/2052* (2013.01); *B60K 2350/2056* (2013.01); *B60K 2350/2095* (2013.01); *B60K 2350/352* (2013.01); *B60K 2350/96* (2013.01); *B60R 2300/107* (2013.01); *B60R 2300/205* (2013.01); *B60R 2300/8086* (2013.01); *G02B 2027/0134* (2013.01); *G02B 2027/0138* (2013.01)

(56) References Cited

FOREIGN PATENT DOCUMENTS

| JP | 2011-090076 | 5/2011 |
|---|---|---|
| JP | 2011-121401 | 6/2011 |
| JP | 2011-253097 | 12/2011 |

* cited by examiner

DISPLAY DEVICE AND DISPLAY METHOD

CROSS-REFERENCE TO RELATED APPLICATIONS

This application is a U.S. national stage application of the PCT International Application No. PCT/JP2015/002337 filed on May 8, 2015, which claims the benefit of foreign priority of Japanese patent application 2014-098815 filed on May 12, 2014, the contents all of which are incorporated herein by reference.

FIELD OF THE INVENTION

The present disclosure relates to a display device for displaying an image or the like.

DESCRIPTION OF THE RELATED ART

In the related art, a display device which projects light indicating an image to a plate-shaped display medium with translucency and reflects the light to the display medium to allow a user visually recognize the image as a virtual image while showing a background behind the display medium to the user is proposed. Such a display device uses a so-called augmented reality (AR) and can display an image relating to the background on the actual background. Specifically, in an automobile relating field, a so-called head-up display (HUD) which displays an image indicating a speed or various warnings during driving to a front of a windshield glass as a virtual image is developed (for example, refer to PTL 1). The windshield glass is, for example, a front glass.

When using such a display device, since a driver that is a user can view a map or a speed meter that is information relating to a driving while viewing an external scene on the front side without the need of largely moving the line of sight, the driver can drive more safely.

CITATION LIST

Patent Literature

PTL 1: Japanese Patent Unexamined Publication No. 2011-90076

SUMMARY OF THE INVENTION

The present disclosure provides a display device which makes it easy to visually recognize a display object.

A display device according to an aspect of the present disclosure includes a display and a controller. The display projects light indicating an image to a display medium with translucency and reflects the light to the display medium to allow a user to visually recognize the image as a virtual image. The controller is configured to perform a first stereoscopic display process for projecting the light indicating each of an image for a left eye and an image for a right eye of the display object on the display. By the process, the display object can be stereoscopically displayed to the user in a three-dimensional image space. The controller further projects light indicating each of the image for a left eye and the image for a right eye of a portion included in a pattern toward from a position disposed closer than the display object along a depth direction in the image space to the display object or the adjacent of the display object on the display. Such a second stereoscopic display process is performed with respect to each of portions of the pattern in the depth direction in order of from a near side toward a far side. Therefore, the pattern is stereoscopically displayed to the user in the image space.

The display device of the present disclosure can makes it easy to visually recognize a display object.

DETAILED DESCRIPTION OF THE PREFERRED EMBODIMENTS

Prior to description of an exemplary embodiment of the present disclosure, problems in a conventional display device are briefly described. In the display device of PTL 1, the user is allowed to visually recognize the virtual image of a 2D image that is a planar image. Here, a technique for stereoscopically visually recognizing the image is reviewed.

That is, the display device projects light indicating a 3D image that is a stereoscopic image and reflects the light to a display medium to allow a user to visually recognize a stereoscopic image behind the display medium. In this case, the display device projects the light indicating the 3D image which is formed by an image for a left eye and an image for a right eye. The display object included in each of the image for a left eye and the image for a right eye has parallax. The parallax is a difference (distance) of positions of the display object in a horizontal direction in the image. The display object is visually recognized such that the display object seems to be displayed in a depth direction according to the parallax. The depth direction is a direction perpendicular to the image. That is, the display object is stereoscopically displayed by the parallax. For example, in a case where the parallax is 0, the display object is displayed on the closest, and the display object is displayed on a far position in the depth direction as the parallax becomes greater.

Here, in a case where the display object is displayed on the far position, the great parallax to the display object is generated. However, if the parallax is great, since a distance between the display object included in the image for a left eye and the display object included in the image for a right eye is long, it is difficult to perform fusing with respect to the display object included in these images by the user. Alternatively, it takes a time after the user focuses on these display objects until the fusing with respect to these display objects is terminated. Therefore, it is difficult to visually recognize the faraway display object stereoscopically.

Hereinafter, the exemplary embodiment will be described while referring to drawings. It is to be noted that each of the exemplary embodiments described below shows a general or a specific example of the present disclosure. The numerical values, shapes, materials, structural elements, the arrangement position and connection form of the structural elements, steps, the processing order of the steps or the like, shown in the following exemplary embodiments are mere examples and do not restrict the present disclosure. Furthermore, among the structural elements in the following exemplary embodiments, structural elements not recited in the independent claims each indicating the top concept are described as arbitrary structural elements.

Figure 1:
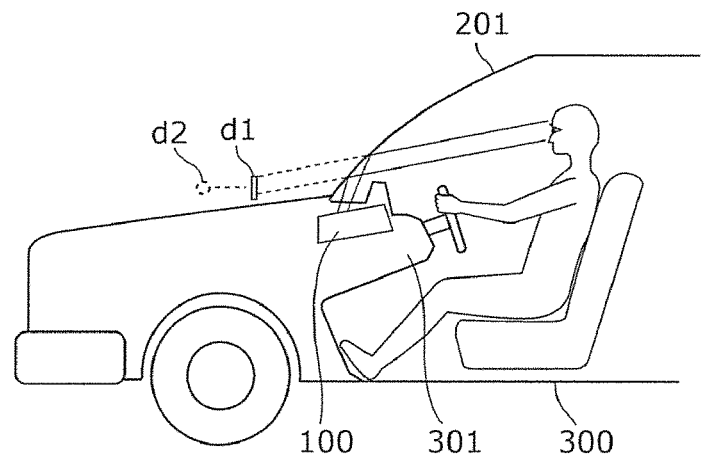
FIG. 1 is a diagram illustrating a usage example of a display device according to an embodiment.

FIG. 1 is a diagram illustrating a usage example of a display device according to an exemplary embodiment. Display device 100 according to the present exemplary embodiment is configured as a so-called head-up display and is attached adjacent to the top surface of dashboard 301 of car 300. Display device 100 projects light indicating image d1 to windshield glass 201 that is a display medium and reflects the light to windshield glass 201. The windshield glass is, for example, a front glass. The reflected light is toward a driver that is a user. As a result, the user can visually recognize a virtual image of image d1 appearing in the outside the car that is an outside of windshield glass 201 by the reflected light, while viewing the background behind windshield glass 201. That is, display device 100 displays image d1 as the virtual image to outside of windshield glass 201.

Display device 100 can display image d1 as a 2D image and can display image d1 as a 3D image. In a case where display device 100 displays the virtual image as the 3D image, display device 100 forms image d1 which is formed by the image for a left eye and the image for a right eye and projects the image d1. Each of the image for a left eye and the image for a right eye of image d1 corresponds to a picture or a frame, and by projecting of image d1, the three-dimensional image space appears at the outside of windshield glass 201 as a virtual image.

In addition, the positions in the horizontal direction in the image of display object d2 included in each of the image for a left eye and the image for a right eye of image d1 are different to each other. That is, the parallax is present in the image for a left eye and the image for a right eye of display object d2. As a result, a virtual image of display object d2 appearing in the three-dimensional image space is visually recognized such that the virtual image is present in a far side in the depth direction from the display standard position in the image space and in a position separated from a distance in accordance with the parallax. Here, the display standard position is a position in the depth direction in which the virtual image of the image in the three-dimensional image space appears by projecting the same image with respect to the right and left eyes, that is, an image without parallax.

In the present exemplary embodiment, image d1 indicates the three-dimensional image space and all of the images or the display objects indicated by the light projected by display device 100 are visually recognized by the user as the virtual images.

Figure 2:
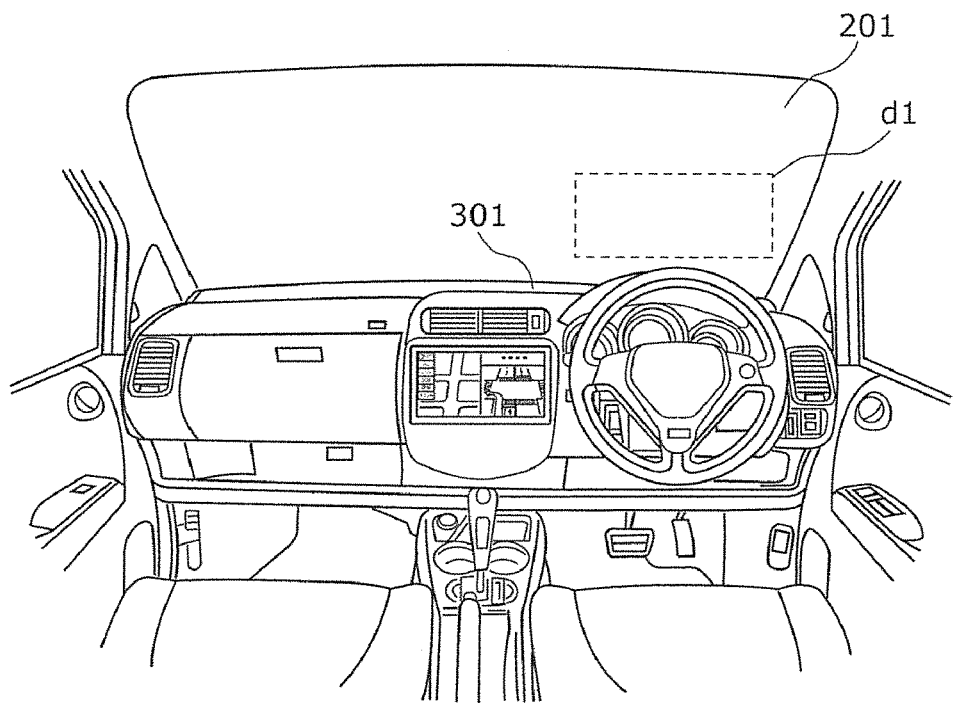
FIG. 2 is a diagram illustrating a region of an image displayed by the display device according to the embodiment.

FIG. 2 is a diagram illustrating a region of an image displayed by display device 100 according to the exemplary embodiment. Display device 100 to be attached to dashboard 301 displays image d1 as the virtual image at the outside the car that is a back side of a projection region when viewed by a user that is a driver, by projecting the light indicating image d1 to the projection region at the lower side which is closer to a driver's seat of windshield glass 201, for example. Here, the display object is disposed in the lower side in image d1 as the position of the display object in the depth direction in the three-dimensional image space becomes closer. On the contrast, the display object is disposed in the upper side in image d1 as the position of the display object in the depth direction in the three-dimensional image space becomes farther.

Figure 3:
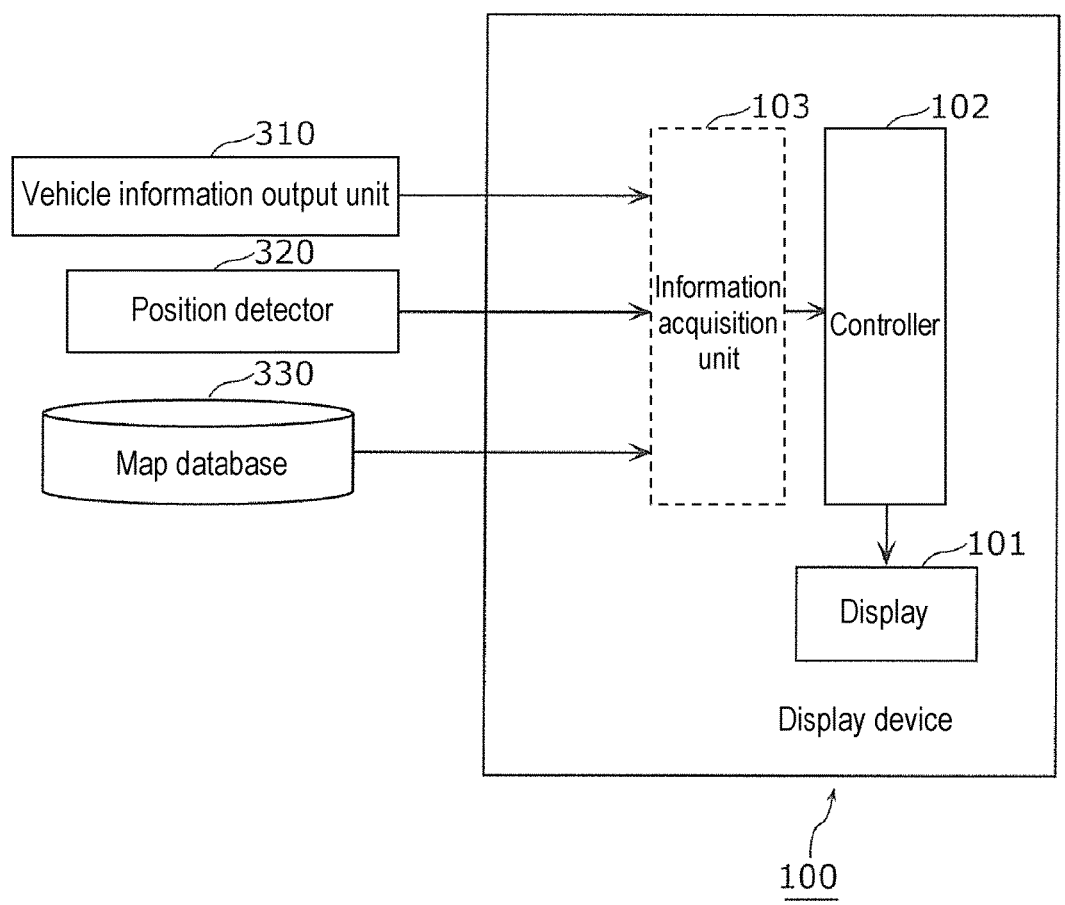
FIG. 3 is a block diagram illustrating a configuration of the display device according to the embodiment.

FIG. 3 is a block diagram illustrating a configuration of display device 100 according to the exemplary embodiment. Display device 100 includes display 101 for projecting light indicating image d1, information acquisition unit 103 for acquiring various information items, and controller 102 for controlling display 101 according to the information acquired by information acquisition unit 103.

Display 101 projects light indicating image d1 to windshield glass 201 that is a display medium with translucency and reflects the light to windshield glass 201 to allow a user to visually recognize image d1 as a virtual image. For example, display 101 is implemented by a liquid crystal on silicon (LCOS) method using a reflective type liquid crystal and a light emitting diode (LED), the DLP (registered trademark) method using a micro mirror array and the LED, a laser scanning method using a micro electro mechanical systems (MEMS) mirror and a semiconductor laser, or the like. In addition, display 101 is configured by, for example, a lenticular method or a parallax barrier method so as to able to stereoscopic viewing the 3D image as image d1 by the naked eyes. The laser scanning method may be a raster scan method, for example.

Information acquisition unit 103 acquires, for example, information from vehicle information output unit 310, position detector 320, and map database 330. Vehicle information output unit 310 outputs vehicle information indicating a travelling velocity, the number of revolutions of an engine, a remaining amount of a fuel in car 300. Position detector 320 detects a position of car 300 using a global positioning system (GPS) and outputs position information indicating the detection result. Map database 330 maintains map information indicating a road shape and a road map and outputs the map information. That is, information acquisition unit 103 acquires the vehicle information, the position information, and the map information and output the information items to controller 102. Display device 100 according to the present exemplary embodiment includes information acquisition unit 103 and may not have information acquisition unit 103.

Controller 102 is configured to form image d1 including display object d2 based on information output from information acquisition unit 103 and project the light indicating image d1 on display 101. That is, controller 102 is configured to display image d1 on display 101. Specifically, controller 102 is configured to form image d1 including the image for a left eye and the image for a right eye of display object d2 and allow to user to stereoscopically recognize display object d2 in three-dimensional image space shown by image d1 by projecting the light indicating image d1 on display 101. Display object d2 is a point of interest (POI) image for identifying a location which is extracted as POI from map information, or the like. Controller 102 is configured to convert the position on the map of the POI to the position in the three-dimensional image space which uses a position of car 300 as a standard based on the positional relationship between the position of car 300 shown by position information and the position on the map of the POI shown by the map information, for example, and form image d1 in which the POI image is disposed in the position of the image space. Controller 102 is configured by, for example, a central processing unit (CPU) or a processor, and executes above described processes by reading a computer program from a recording medium and executing the program.

Figure 4A:
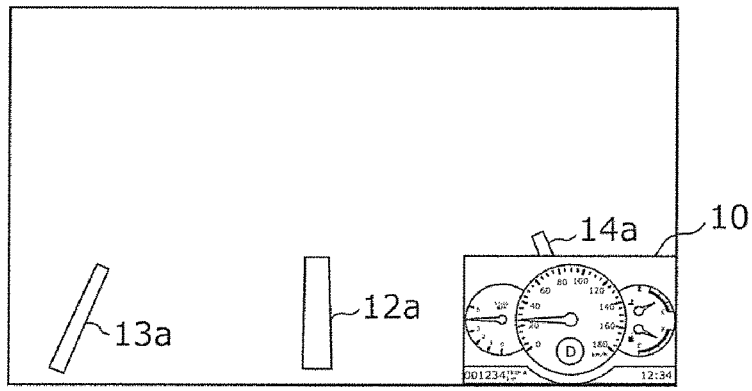
FIG. 4A is a diagram illustrating an example of an image displayed by the display device according to the embodiment.
Figure 4B:
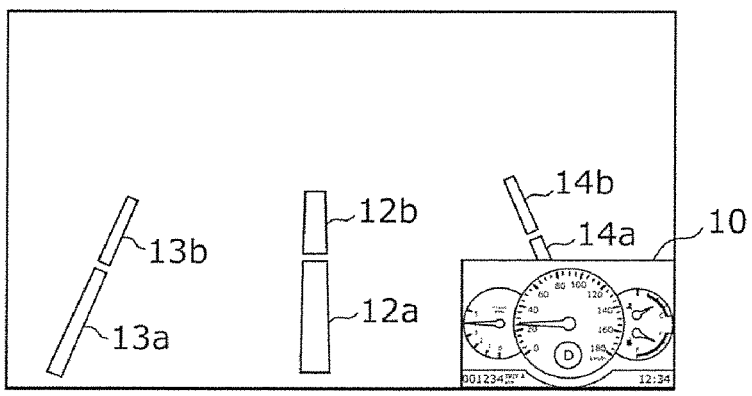
FIG. 4B is a diagram illustrating an example of an image displayed by the display device according to the embodiment.
Figure 4C:
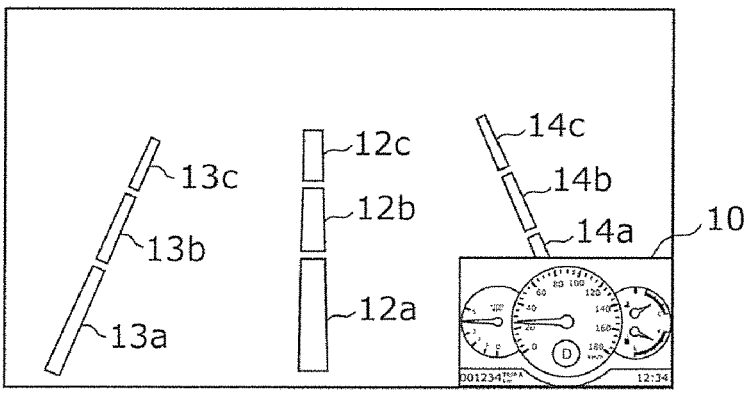
FIG. 4C is a diagram illustrating an example of an image displayed by the display device according to the embodiment.
Figure 4D:
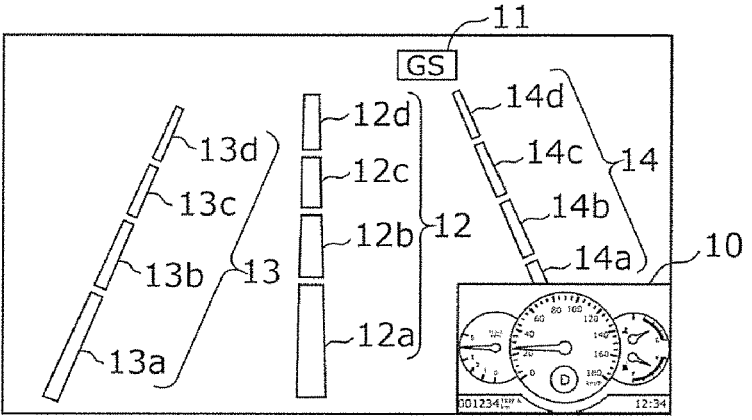
FIG. 4D is a diagram illustrating an example of an image displayed by the display device according to the embodiment.

FIGS. 4A to 4D are diagrams illustrating an example of an image displayed by display device 100 according to the exemplary embodiment. When it is determined that car 300 approaches POI that is an interesting target to the user based on the position information and the map information, controller 102 of display device 100 determines POI image 11 corresponding to POI illustrated in FIG. 4D as the display object. Controller 102 determines the display distance that is a distance from the display standard position to the position of POI image 11 in the depth direction of the three-dimensional image space. Here, when it is determined that the display distance of POI image 11 is equal to or more than the threshold value, as illustrated in FIG. 4D, controller 102 executes a process for stereoscopically displaying patterns 12, 13, and 14 for easily recognizing POI image 11 stereoscopically. Patterns 12, 13, and 14 are a pattern from a position closer than POI image 11 that is the display object of the three-dimensional image space in the depth direction toward POI image 11. Pattern 12 is a line which is parallel to the center axis of car 300, for example, and is formed by portions 12a to 12d which have the different display distances in the depth direction. Pattern 13 is a line indicating a left end of the road on which car 300 is travelling, for example, and is formed by portions 13a to 13d which have the different display distances in the depth direction. Pattern 14 is a line indicating a right end of the road on which car 300 is travelling, for example, and is formed by portions 14a to 14d which have the different display distances in the depth direction. Any one of the patterns may be a line indicating a center of a road on which car 300 is travelling.

Controller 102 is configured to display each of the portions of the patterns on display 101 in order from a near side toward a far side in the depth direction without displaying all of patterns 12, 13, and 14 at the same time. That is, controller 102 performs the second stereoscopic display process to each of portions of the patterns in order from the near side toward the far side in the depth direction to allow the user to stereoscopically recognize the pattern in the three-dimensional image space. The second stereoscopic display process is a process of projecting the light indicating each of the image for a left eye and the image for a right eye of a portion included in POI image 11 from a position closer than POI image 11 along the depth direction in the three-dimensional image space or the pattern toward the near POI image 11 on display 101.

Specifically, as illustrated in FIG. 4A, first, controller 102 is configured to display portion 12a which is disposed in the closest position among pattern 12, portion 13a which is disposed in the closest position among pattern 13, and portion 14a which is disposed in the closest position among pattern 14 on display 101. Next, as illustrated in FIG. 4B, controller 102 is configured to display portion 12b which is disposed in the second closest position among pattern 12, portion 13b which is disposed in the second closest position among pattern 13, and portion 14b which is disposed in the second closest position among pattern 14 on display 101.

Next, as illustrated in FIG. 4C, controller 102 is configured to display portion 12c which is disposed in the third closest position among pattern 12, portion 13c which is disposed in the third closest position among pattern 13, and portion 14c which is disposed in the third closest position among pattern 14 on display 101. Finally, as illustrated in FIG. 4D, controller 102 is configured to display portion 12d which is disposed in the farthest position among pattern 12, portion 13d which is disposed in the farthest position among pattern 13, and portion 14d which is disposed in the farthest position among pattern 14 on display 101. In this time, controller 102 is configured to display POI image 11 that is the display object on display 101. That is, controller 102 is configured to perform the first stereoscopic display process that is a process for projecting the light indicating each of the image for a left eye and the image for a right eye of POI image 11 on display 101 to allow the user to stereoscopically recognize POI image 11 in the three-dimensional image space.

As illustrated in FIGS. 4A to 4D, controller 102 performs a plane-view display process for projecting the light indicating the same image with respect to the left and the right eyes on display 101 to display vehicle information image 10 in the three-dimensional image space on the display standard position as the display object for a plane view always, regardless of whether the first and the second stereoscopic display processes is performed. Vehicle information image 10 is an image of a meter indicating a state of car 300 as a numerical value and an image in which a speedometer, a tachometer, and a fuel level meter corresponding to the vehicle information is drawn. Therefore, since the information such as a travelling speed of the car which is important to the user is informed to the user by the display of vehicle information image 10 that is the display object for a plan view regardless of whether or not the 3D image such as POI image 11 is displayed. Accordingly, the user easily performs the fusion with respect to vehicle information image 10. Therefore, the user can appropriately grasp the information shown by vehicle information image 10 without a misperception of the information.

FIGS. 5A to 5D are diagrams illustrating another example of an image displayed by display device 100 according to the exemplary embodiment.

Figure 5A:
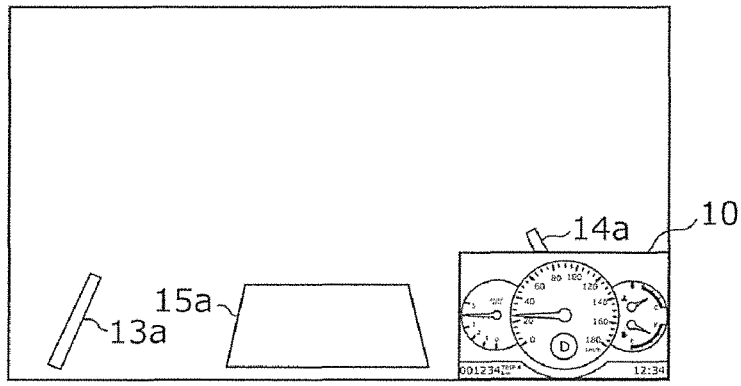
FIG. 5A is a diagram illustrating another example of an image displayed by the display device according to the embodiment.
Figure 5B:
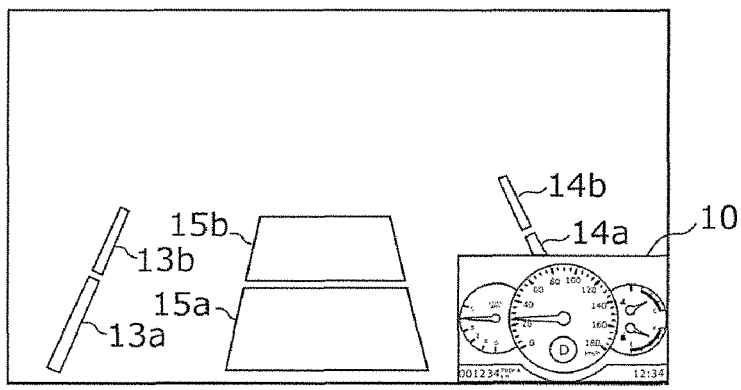
FIG. 5B is a diagram illustrating another example of an image displayed by the display device according to the embodiment.
Figure 5C:
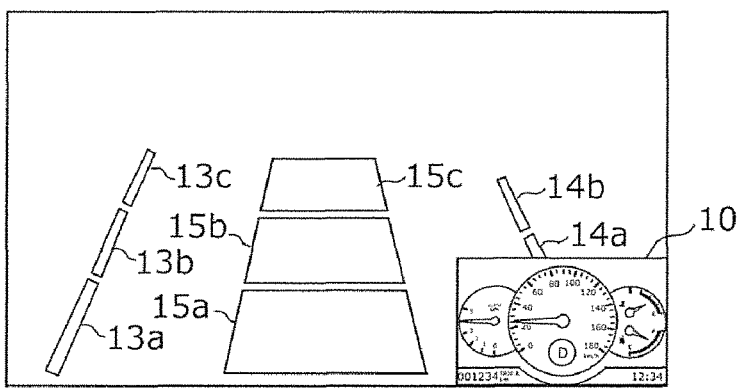
FIG. 5C is a diagram illustrating another example of an image displayed by the display device according to the embodiment.
Figure 5D:
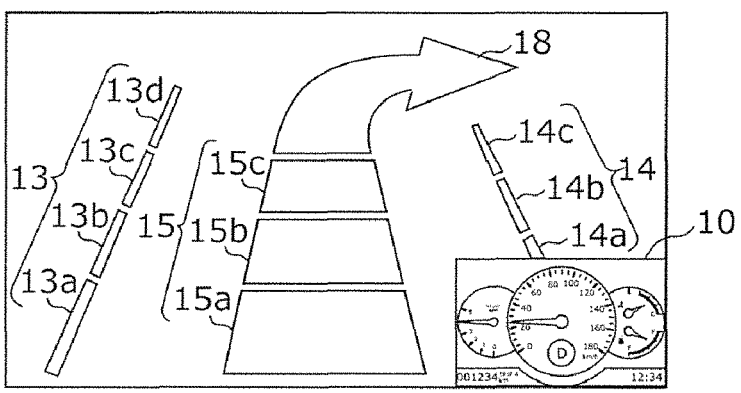
FIG. 5D is a diagram illustrating another example of an image displayed by the display device according to the embodiment.

When it is determined that it should turn right at the next intersection based on the position information and the map information, controller 102 of display device 100 specifies right turn indication image 18 illustrated in FIG. 5D as the display object. Controller 102 is configured to determine the display distance that is a distance from the display standard position to the position of right turn indication image 18 in the depth direction of the three-dimensional image space. Here, when it is determined that the display distance of right turn indication image 18 is equal to or more than the threshold value, as illustrated in FIG. 5D, controller 102 executes a process of stereoscopically displaying of patterns 13, 14, and 15 for easily visually recognizing right turn indication image 18 stereoscopically. Patterns 13, 14, and 15 are a pattern from a position closer than right turn indication image 18 that is the display object of the three-dimensional image space in the depth direction toward right turn indication image 18. Pattern 15 is a line which is continues to right turn indication image 18, for example, and is formed by portions 15*a* to 15*c* which have the different display distances in the depth direction.

As the same manner as that of the process operation illustrated in FIGS. 4A to 4D, controller 102 is configured to display each of the portions of the patterns on display 101 in order from a near side toward a far side in the depth direction without displaying all of patterns 13, 14, and 15 at the same time.

Specifically, as illustrated in FIG. 5A, first, controller 102 is configured to display portion 15*a* which is disposed in the closest position among pattern 15, portion 13*a* which is disposed in the closest position among pattern 13, and portion 14*a* which is disposed in the closest position among pattern 14 on display 101. Next, as illustrated in FIG. 5B, controller 102 is configured to display portion 15*b* which is disposed in the second closest position among pattern 15, portion 13*b* which is disposed in the second closest position among pattern 13, and portion 14*b* which is disposed in the second closest position among pattern 14 on display 101.

Next, as illustrated in FIG. 5C, controller 102 is configured to display portion 15*c* which is disposed in the farthest position among pattern 15 and portion 13*c* which is disposed in the third closest position among pattern 13 on display 101. Finally, as illustrated in FIG. 5D, controller 102 is configured to display right turn indication image 18 that is the display object on display 101 and display portion 13*d* which is disposed in the farthest position among pattern 13 and portion 14*c* which is disposed in the farthest position among pattern 14 on display 101. As illustrated in FIGS. 5A to 5D, in this case, controller 102 displays vehicle information image 10 to the display standard position always.

In this manner, in the present exemplary embodiment, the second stereoscopic display process is performed with respect to each of portions of the pattern in an order from a near side toward a far side, as a process for stereoscopically displaying with respect to a portion of a line-shaped pattern, for example, toward the display object along the depth direction of the three-dimensional image space. Here, the display object is POI image 11 or right turn indication image 18. Therefore, the position of each of the portions which are to be sequentially displayed in the depth direction and is included in the pattern is moved away progressively to near the display object. Accordingly, when user views each of the portions in the order that the display object is stereoscopically displayed by the eyes, it is possible to adjust to the fusion by the user gradually to the far side. Therefore, even when the display object is disposed in a faraway position, the fusion with respect to the display object can be easily performed. Therefore, the user can easily visually recognize the faraway display object stereoscopically.

Figure 6:
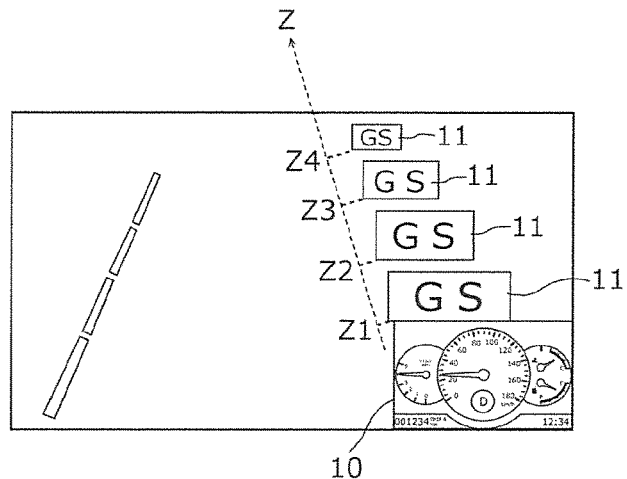
FIG. 6 is a diagram illustrating an example of a size and a position of a display object according to the embodiment.

FIG. 6 is a diagram illustrating an example of a size and a position of a display object according to the exemplary embodiment.

In a case where POI image 11 that is the display object is displayed on display 101, for example, controller 102 displays POI image 11 large at the lower side, as position z of POI image 11 in the three-dimensional image space in the depth direction (z axis direction in FIG. 6) becomes closer. On the contrast, controller 102 displays POI image 11 small at the upper side, as position z of POI image 11 in the depth direction (z axis direction in FIG. 6) becomes farther. Specifically, in a case where the position of POI image 11 in the depth direction satisfies a relation of z=z1, controller 102 displays POI image 11 large on the lower side. In a case where POI image 11 is displayed on far position z2 in a depth direction than position z1, controller 102 displays POI image 11 smaller than the case of the relation of z=z1 on the upper side. In a case where POI image 11 is displayed on far position z3 in a depth direction than position z2, controller 102 displays POI image 11 smaller than the case of the relation of z=z2 on the upper side. In a case where POI image 11 is displayed on far position z4 in a depth direction than position z3, controller 102 displays POI image 11 smaller than the case of the relation of z=z3 on the upper side.

In this manner, in the present exemplary embodiment, controller 102 projects the light indicating each of the image for a left eye and the image for a right eye of the display object on the display 101 such that the display object is visible small as the position of the display object in the three-dimensional image space in the depth direction becomes farther. Accordingly, the user can easily grasp the position of the display object in the depth direction from the size of the display object. Therefore, the fusion with respect to the display object can further be easily performed. Furthermore, controller 102 is configured to project the light indicating each of the image for a left eye and the image for a right eye of the display object on display 101 such that the position of the display object to be viewed is high with an increase in a distance of the position of the display object in the depth direction. Therefore, the user can easily grasp the position of the display object in the depth direction from the position of the display object to be viewed in the vertical direction. As a result, the user can easily perform the fusion with respect to the display object.

Figure 7:
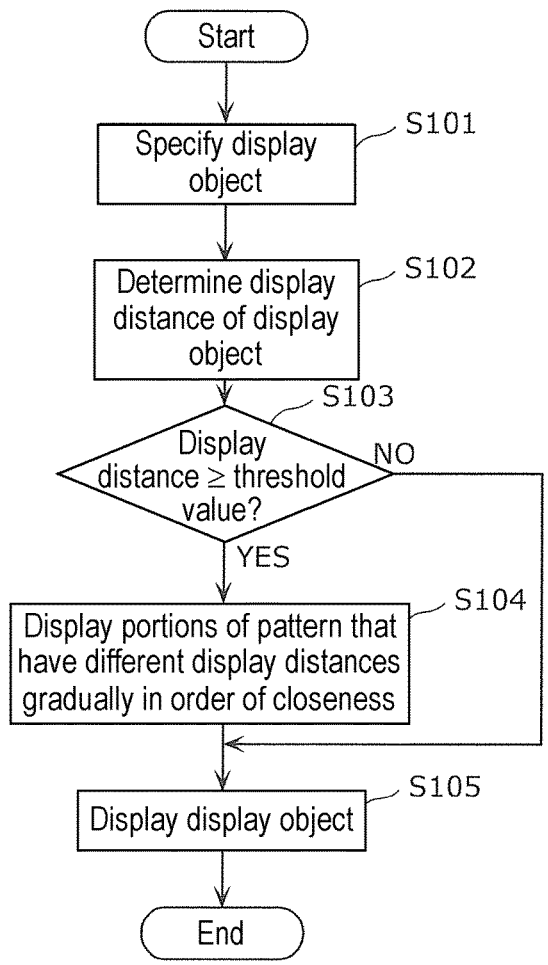
FIG. 7 is a flowchart illustrating a process operation of the display device according to the embodiment.

FIG. 7 is a flowchart illustrating a process operation of display device 100 according to the exemplary embodiment.

Controller 102 is configured to specify the display object to be displayed based on vehicle information, position information, and map information (step S101). Next, controller 102 is configured to determine a display distance of the specified display object (step S102). For example, when controller 102 specifies POI image 11 as the display object, controller 102 converts the position on the map of a POI to a position in the three-dimensional image space based on a relative positional relationship between a position on the map of the POI identified by POI image 11 and a position of car 300 indicated by the position information. Controller 102 is configured to determine a distance in a depth direction between a display standard position in the image space and the position of POI which is obtained by converting processing as the display distance.

Here, controller 102 is configured to determine whether the display distance is equal to or more than the threshold value (step S103). Here, when it is determined that the display distance is equal to or more than the threshold value (YES in step S103), controller 102 displays each of the portions of the patterns in the gradually different display distances on display 101 in order of a near side in the depth direction (step S104). That is, in step S104, controller 102 performs the second stereoscopic display process which projects light indicating each of the image for a left eye and the image for a right eye of a portion included in a pattern toward from a position disposed closer than the display object along a depth direction in the three-dimensional image space to the display object or the adjacent of the display object with respect to each of portions of the pattern in the depth direction in order of from a near side toward a far side on display 101. On the other hand, when it is determined that the display distance is not equal to or more than the threshold value (NO in step S103), controller 102 does not perform the process of displaying each of the portions of the pattern in the order. Finally, controller 102 controls display 101 to display the display object which is specified in step S101 to a position of the three-dimensional image space shown by the display distance determined in step S102.

In the flow chart illustrated in FIG. 7, after the process in step S104, the process in step S105 is performed. However, each of processes in steps S104 and S105 may be performed at the same time and after the process in step S105, the process of step S104 may be performed. In addition, without the determination of step S103, that is, regardless of the display distance, the process (step S104) for stereoscopically displaying the pattern may be performed. In addition, without displaying each of the portions of the pattern in order, all of the patterns may be displayed at the same time.

In addition, in step S104, controller 102 may be configured to perform the second stereoscopic display process with respect to each of the portions which are continuously disposed in a depth direction. In this case, it is possible to adjust to the fusion by the user smoothly. In addition, controller 102 may be configured to perform the second stereoscopic display process with respect to each of the portions which are intermittently disposed in a depth direction. In this case, since each of the portions of the pattern which is stereoscopically displayed is intermittently disposed, it is possible to reduce the processing load for performing the stereoscopic display of the pattern.

In addition, controller 102 may repeatedly execute the process of step S104. That is, when entire the patterns are displayed, controller 102 removes the pattern on display 101, and performs the second stereoscopic display process with respect to each of the portions of the pattern in order of the near side to the far side in the depth direction again. Therefore, the user can easily visually recognize the faraway display object stereoscopically, in any timing.

Modification Example 1

In the above described exemplary embodiment, display device 100 is disposed on dashboard 301. However, display device 100 may be attached on a roof of car 300.

Figure 8:
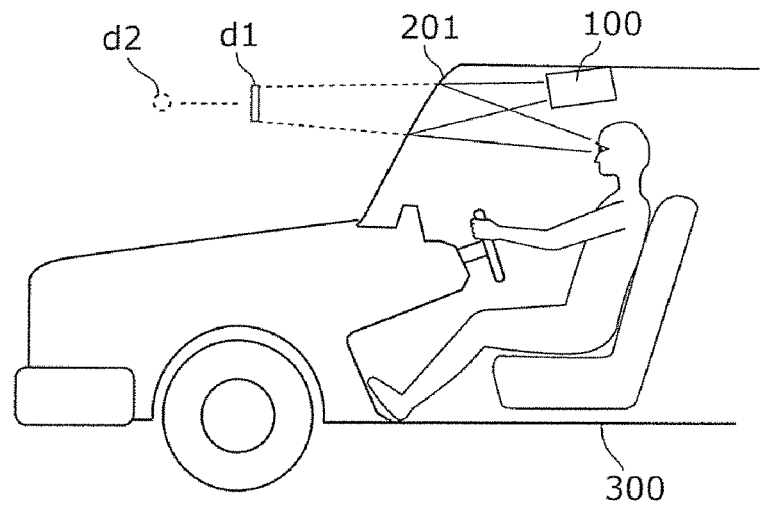
FIG. 8 is a diagram illustrating a usage example of a display device according to Modification Example 1 of the embodiment.

FIG. 8 is a diagram illustrating a usage example of display device 100 according to Modification Example 1 of the exemplary embodiment. Display device 100 according to Modification Example 1 is attached on a roof near the driver's seat of car 300. Even in a case of display device 100 which is attached such that manner, as the same manner as that of the exemplary embodiment described above, the light indicating image d1 is projected to windshield glass 201 and is reflected on windshield glass 201. The reflected light is directed to the driver that is a user. As a result, the user can visually recognize the virtual image of image d1 appearing outside windshield glass 201 by the reflected light while viewing the background behind windshield glass 201. Furthermore, in a case where image d1 is a 3D image, display device 100 allows the user stereoscopically visually recognize the virtual image of display object d2 in the three-dimensional image space. That is, display device 100 displays the virtual image of display object d2 on a position separated in a far side in the depth direction from the display standard position in the three-dimensional image space.

On the other hand, display device 100 according to Modification Example 1 is different from the above-described exemplary embodiment and displays image d1 on the upper side as the virtual image.

Figure 9:
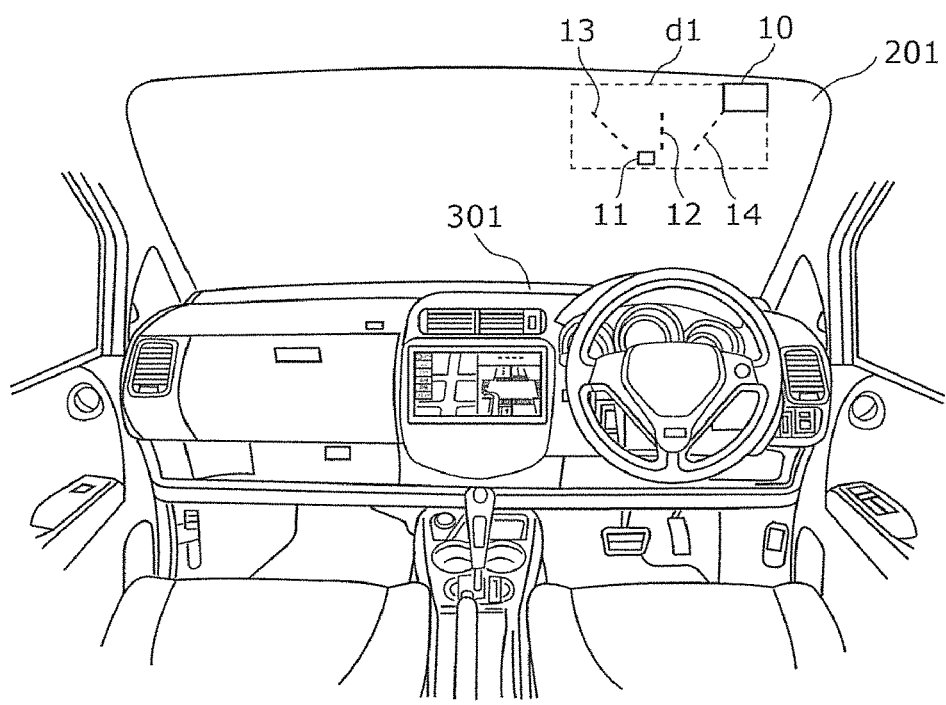
FIG. 9 is a diagram illustrating an image displayed by the display device according to Modification Example 1 of the embodiment.

FIG. 9 is a diagram illustrating an image displayed by display device 100 according to Modification Example 1 of the exemplary embodiment. Display device 100 projects the light indicating image d1 on the projection region at the upper side which is closer to a driver's seat, for example, of windshield glass 201 to display image d1 as the virtual image at the outside the car that is a rear side of the projection region when viewed from the user that is a driver. Here, the display object is disposed in the upper side in image d1 as the position of the display object in the depth direction in the three-dimensional image space becomes closer. On the contrast, the display object is disposed in the lower side in image d1 as the position of the display object in the depth direction in the three-dimensional image space becomes farther. For example, POI image 11 which is a display object of which the position in the depth direction is far is disposed small in the lower side in image d1. In addition, vehicle information image 10 that is the display object for a plane view is disposed large on the upper side in image d1. In Modification Example 1, each of the portions of patterns 12 and 13 is displayed in order from the upper side.

Even in Modification Example 1, in the same manner as that of Exemplary Embodiment 1, a second stereoscopic display process is performed with respect to each of the portions of the pattern in order from the front side (upper side) to the faraway (lower side), as a process for stereoscopically displaying with respect to a portion of a line-shaped pattern, for example, toward the display object along the depth direction of the three-dimensional image space. Here, the display object is POI image 11. Therefore, the position of each of the portions in the depth direction which are to be sequentially stereoscopically displayed and is included in the pattern is moved away progressively to near the display object. Accordingly, when the user views each of the portions in the order that the display object is stereoscopically displayed by the eyes, it is possible to adjust to the fusion by the user gradually to the far side. Therefore, even when the display object is disposed in a faraway position, the fusion with respect to the display object can be easily performed. Therefore, the user can easily visually recognize the faraway display object stereoscopically.

Modification Example 2

In the above-described exemplary embodiment and Modification Example 1, the line virtually showing each of the right end and the left end of the road is displayed as a pattern, regardless of the actual road behind windshield glass 201. However, the line to be shown to the user by emphasizing the actual end of the road may be displayed as the pattern.

Figure 10:
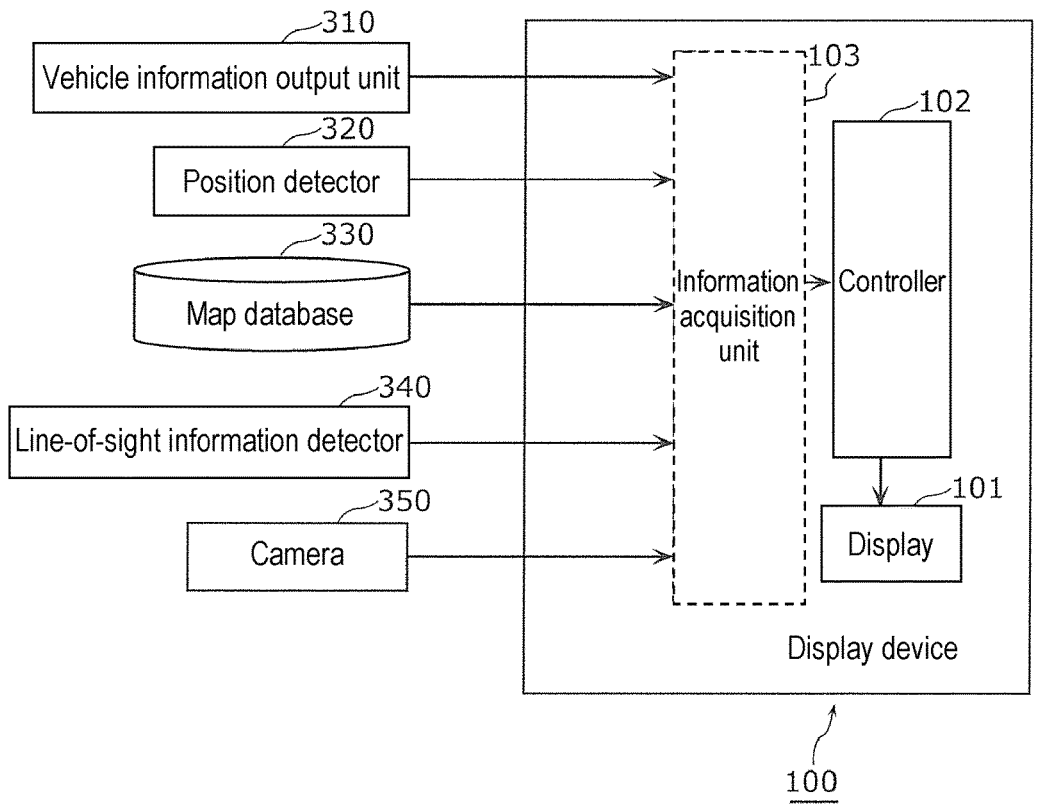
FIG. 10 is a block diagram illustrating a configuration of a display device according to Modification Example 2 of the embodiment.

FIG. 10 is a block diagram illustrating a configuration of display device 100 according to Modification Example 2 of the exemplary embodiment. Display device 100 according to Modification Example 2 includes display 101, controller 102, and information acquisition unit 103 as the same manner as that of the above-described exemplary embodiment. Here, display 101 according to the present modification example projects the light indicating the image with respect to the entire surface of windshield glass 201 and can display the image by superimposing the images with respect to the entire the background behind windshield glass 201. In addition, information acquisition unit 103 according to the present modification example acquires line-of-sight information output from line-of-sight information detector 340 and video information output from camera 350 in addition to the vehicle information, the position information, and the map information.

Line-of-sight information detector 340 detects the line-of-sight information indicating the position of the both eyes of the user that is a driver, a line of sight and a view point, or the like. Specifically, line-of-sight information detector 340 analyzes the image to be obtained by imaging a user's face to detect the line-of-sight information of the user. For example, line-of-sight information detector 340 performs a binarization on the image to be obtained by imaging and an image process such as a feature point extraction process or pattern matching to detect the line-of-sight of the user. Line-of-sight information detector 340 outputs the detected line-of-sight information of the user to display device 100.

Camera 350 images the road in front of car 300 and outputs video information indicating the video which is obtained by the imaging to display device 100.

Controller 102 is configured to acquire the line-of-sight information and the video information through information acquisition unit 103. Controller 102 specifies the shape and the position of the road in front of car 300 three-dimensionally based on the video information and the predetermined position and the imaging direction of camera 350. In order to specify the shape and the position of the road three-dimensionally, controller 102 may acquire the video information items from a plurality of camera 350 and specify the shape and the position of the road by triangulation. In addition, in a case where since the ends of the road is hidden due to snow or the like, for example, the shape and the position of the road cannot be specified using the video information, controller 102 may specify the shape and the position of the road based on the map information.

Furthermore, controller 102 is configured to display the line emphasizing each of the both ends of the road on display 101 as the pattern described above based on the position of the both eyes of the user shown by the line-of-sight information, a line of sight and a view point, and the specified shape and the position of the road. That is, controller 102 is configured to display the line emphasizing each of the both ends of the road on a position in the three-dimensional image space shown by image d1 in which the both ends of the road appearing to a view field of the user behind windshield glass 201 are overlapped to each other.

Figure 11:
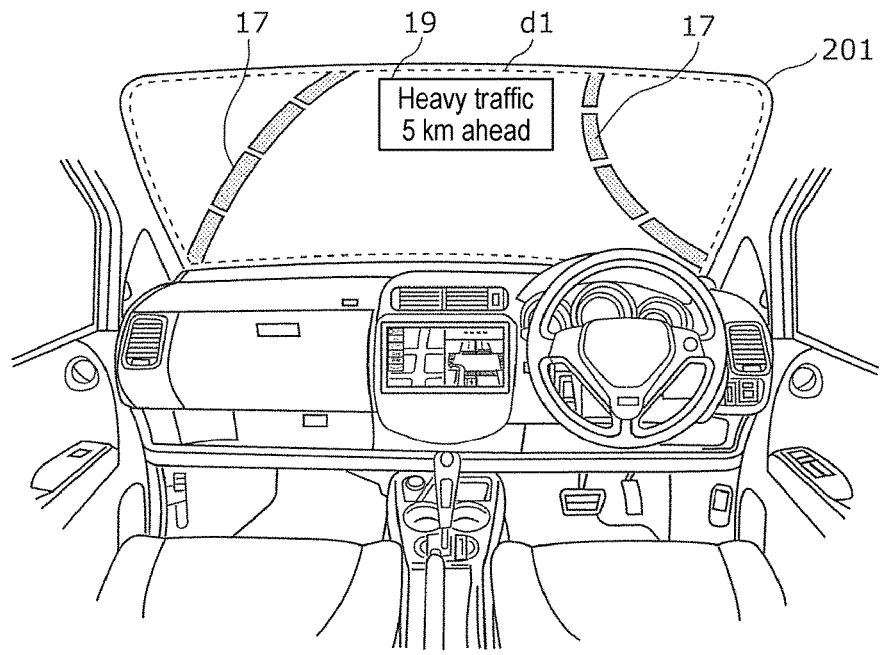
FIG. 11 is a diagram illustrating an image displayed by the display device according to Modification Example 2 of the embodiment.

FIG. 11 is a diagram illustrating an image displayed by display device 100 according to Modification Example 2 of the exemplary embodiment.

For example, controller 102 acquires road traffic information output from vehicle information output unit 310 through information acquisition unit 103 and specifies attention seeking image 19 that informs there is a heavy traffic as the display object based on the road traffic information. In a case where attention seeking image 19 is displayed on a faraway in the three-dimensional image space, controller 102 displays line 17 emphasizing each of the both ends of the road in front of car 300 on display 101 as the pattern.

That is, line 17 shown by the significantly different brightness or color difference between the ambient are superimposed as the pattern described above at the positions of the both ends of the road viewed from the user. Line 17 is a pattern appearing on the three-dimensional image space along each shape of the both ends of the road and is a pattern toward from the position closer than attention seeking image 19 along the depth direction in the three-dimensional image space to attention seeking image 19.

When line 17 is displayed on display 101, the controller 102 performs the second stereoscopic display process in the same manner as that of patterns 12 to 15 in the exemplary embodiment with respect to each of the portions of line 17 in the order from the near side toward the far side in the depth direction to allow the user to stereoscopically recognize line 17 in the three-dimensional image space. Here, the second stereoscopic display process is a process of projecting the light indicating each of the image for a left eye and the image for a right eye of a portion included line 17 on display 101.

In Modification Example 2, in the same manner as that of Exemplary Embodiment 1, the second stereoscopic display process is performed with respect to each of portions of the pattern in an order from a near side toward a far side, as a process for stereoscopically displaying with respect to a portion of a line-shaped pattern, for example, toward attention seeking image 19 that is the display object along the depth direction of the three-dimensional image space. Accordingly, when user views each of the portions in the order that the display object is stereoscopically displayed by the eyes, it is possible to adjust to the fusion by the user gradually to the far side. Therefore, even when the display object is disposed in a faraway position, the fusion with respect to the display object can be easily performed. Therefore, the user can easily visually recognize the faraway display object stereoscopically. Furthermore, in the present modification example, since the both ends of the road are emphasized, the user can safely be travelling.

Figure 12:
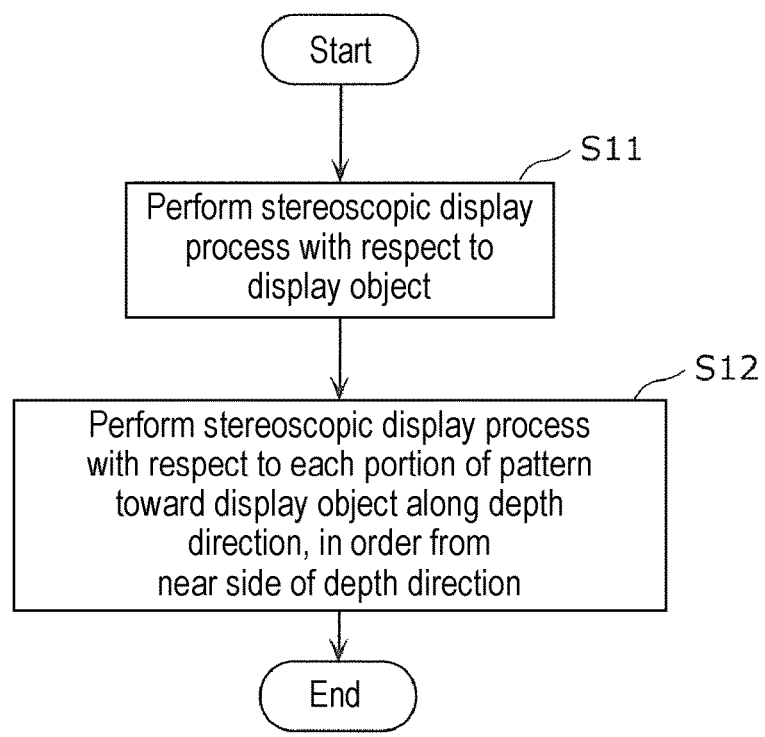
FIG. 12 is a flowchart illustrating a display method according to the embodiment.

FIG. 12 is a flowchart illustrating a display method according to the present disclosure.

The display method is a display method using display 101 that projects light indicating an image to a display medium with translucency and reflects the light to the display medium to allow a user to visually recognize the image as a virtual image and includes steps S11 and S12. That is, in the display method, first, the first stereoscopic display process for projecting the light indicating each of an image for a left eye and an image for a right eye of the display object on display 101 to allow the user to stereoscopically recognize the display object in the three-dimensional image space (step S11). Next, the second stereoscopic display process which projects light indicating each of the image for a left eye and the image for a right eye of a portion included in a pattern toward from a position disposed closer than the display object along a depth direction in the image space to the display object or the adjacent of the display object on display 101 is performed with respect to each portions of the pattern in the depth direction in order of from a near side toward a far side to allow the user to stereoscopically recognize the pattern in the image space (step S12).

According to the display method, in the same manner as that of the exemplary embodiment and modification examples, the user can easily visually recognize the faraway display object stereoscopically. In the flow chart illustrated in FIG. 12, after the process in step S11, the process in step S12 is performed. However, each of the processes in steps S11 and S12 may be performed at the same time and after the process in step S12, the process of step S11 may be performed.

In the above-described exemplary embodiment and the each of the modification examples, the structural elements may be configured in the form of an exclusive hardware product, or may be realized by executing a software program suitable for the structural element. The structural elements may be implemented by a program execution unit such as a CPU or a processor which reads and executes a software program recorded on a recording medium such as a hard disk or a semiconductor memory. Here, the computer program implementing the display device of the above-described exemplary embodiment and the modification examples causes a computer to execute step S11 and step S12 illustrated in FIG. 12.

In addition, in the above-described exemplary embodiment and the modification examples, display device 100 may be an on-vehicle display device. However, display device 100 may not be the on-vehicle display device. For example, display device 100 may be mounted on a glass which is configured as a wearable device. In this case, display device 100 projects the light indicating image for a left eye for 3D, for example, to a lens for a left eye of the glass (display medium) and projects the light indicating the image for a right eye for 3D to a lens for a right eye of the glass (display medium). Even in a case where display device 100 is mounted on the glass, the user can easily visually recognize the faraway display object, stereoscopically, as the same manner as that of the above-described exemplary embodiment and the modification examples.

Although the display device 100 according to one or more aspects were described based on the exemplary embodiment and the modification examples thereof, the present disclosure is not limited to the exemplary embodiment. The one or more aspects may include, without departing from the scope of the present invention, an exemplary embodiment obtained by making various modifications which those skilled in the art would conceive to the present exemplary embodiment, or an exemplary embodiment obtained by combining structural elements in different exemplary embodiments or modification examples.

The present disclosure also involves the following.

(1) The aforementioned respective devices may be formed, specifically, as a computer system including a microprocessor, a ROM, a RAM, a hard disk unit, a display unit, and so on. The RAM or the hard disc unit stores a computer program. The microprocessor operates in accordance with the computer program, so that each of the devices accomplishes its function. Here, the computer program is, for accomplishing a predetermined function, configured by combining a plurality of instruction codes indicating instructions for a computer.

(2) A part or all of the components constituting each of the above devices may be formed by a single system large-scale integration (LSI) circuit. The System LSI is a super multifunction LSI manufactured by integrating a plurality of constituent units on a single chip, and is, specifically, a computer system including a microprocessor, a ROM, a RAM, and so on. The RAM stores a computer program. The microprocessor operates in accordance with the computer program, so that the system LSI accomplishes its function.

(3) A part or all of the components constituting each of the devices may be formed as an IC card which is detachable from each of the devices or a single module. The IC card or the module is a computer system including a microprocessor, a ROM, a RAM, and so on. The IC card or the module may include the super multifunction LSI. The microprocessor operates in accordance with the computer program, so that the IC card or the module accomplishes its function. The IC card or the module may have tamper resistance.

(4) The present disclosure may be in the form of the method described above. In addition, the present disclosure may be a computer program which realizes the method by a computer, or may be digital signals including the computer program.

The present disclosure may also be realized by recording the computer program or the digital signal in a computer readable recording medium, such as a flexible disk, a hard disk, a CD-ROM, an MO, a DVD, a DVD-ROM, a DVD-RAM, a Blue-ray (registered trademark) disc (BD), a semiconductor memory, and so on. Alternatively, the present disclosure may also include the digital signal recorded in these recording media.

The present disclosure may also be realized by transmission of the aforementioned computer program or digital signal via an electric telecommunication line, a wireless or wired communication line, a network represented by the Internet, a data broadcast, and so on.

The present disclosure may also be a computer system including a microprocessor and a memory, in which the memory stores the aforementioned computer program, and the microprocessor operates in accordance with the computer program.

Furthermore, the program or the digital signal may be recorded in the recording medium so as to be transferred, or the program or the digital signal may be transferred via the network or the like so as to be executed by another independent computer system.

(5) The above-describe exemplary embodiment and the modification examples may be combined arbitrarily.

As described above, the display device according to an aspect of the present disclosure includes a display and a controller. The display projects light indicating an image to a display medium with translucency and reflects the light to the display medium to allow a user to visually recognize the image as a virtual image. The controller is configured to perform a first stereoscopic display process for projecting the light indicating each of an image for a left eye and an image for a right eye of the display object on the display. By the process, the display object can be stereoscopically displayed to the user in a three-dimensional image space. The controller further projects light indicating each of the image for a left eye and the image for a right eye of a portion included in a pattern toward from a position disposed closer than the display object along a depth direction in the image space to the display object or the adjacent of the display object on the display. Such a second stereoscopic display process is performed with respect to each of portions of the pattern in the depth direction in order of from a near side toward a far side. Therefore, the pattern is stereoscopically displayed to the user in the image space.

Therefore, the second stereoscopic display process is performed with respect to each of portions of the pattern in an order from a near side toward a far side, as a process for stereoscopically displaying with respect to a portion of a line-shaped pattern, for example, toward the display object along the depth direction. Therefore, the position of each of the portions which are to be sequentially displayed in the depth direction and is included in the pattern is moved away progressively to near the display object. Accordingly, when the user views each of the portions in the order that the display object is stereoscopically displayed by the eyes, it is possible to adjust to the fusion by the user gradually to the far side. Therefore, even when the display object is disposed in a faraway position, the fusion with respect to the display object can be easily performed. Therefore, the user can easily visually recognize the faraway display object stereoscopically.

For example, the controller may be configured to perform the second stereoscopic display process with respect to each of the portions which are continuously disposed in a depth direction. Therefore, it is possible to adjust to the fusion by the user smoothly.

In addition, the controller may be configured to perform the second stereoscopic display process with respect to each of the portions which are intermittently disposed in a depth direction. Therefore, since each of the portions of the pattern which is stereoscopically displayed is intermittently disposed, it is possible to reduce the processing load for performing the stereoscopic display of the pattern.

In addition, the controller may be configured to perform the first stereoscopic display process such that the display object is viewed small with an increase in a distance of the position of the display object in the image space in the depth direction. Therefore, the user can easily grasp the position of the display object in the depth direction from the size of the display object. As a result, the user can easily perform the fusion with respect to the display object.

In addition, the controller may be configured to perform the first stereoscopic display process such that the position of the display object to be viewed is high with an increase in a distance of the position of the display object in the image space in the depth direction. Therefore, the user can easily grasp the position of the display object in the depth direction from the position of the display object in the vertical direction. As a result, the user can easily perform the fusion with respect to the display object.

In addition, the controller may be configured to perform a plan display process for projecting light indicating the same image to left and right eyes on the display to allow the user to visually recognize a display object for a plan view in the image space, regardless of whether or not the first and the second stereoscopic display processes are performed. For example, the display object for a plan view is a meter indicating a state of a car on which the display device is mounted as a numerical value. Therefore, since the information such as a travelling speed of the car which is important to the user is informed to the user by the display of the display object for a plan view regardless of whether or not the 3D image is displayed, the user can appropriately grasp the information.

In addition, the controller may be configured to determine whether a display distance that is a distance from a display standard position of the image space in the depth direction to the position of the display object is equal to or more than a predetermined threshold value, and when it is determined that the display distance is equal to or more than the threshold value, the controller is configured to performed the second stereoscopic display process with respect to each of the portions of the pattern in the order. Therefore, since the pattern is displayed when the display distance is equal to or more than the threshold value, it is possible to prevent that the pattern with respect to the display object which is disposed in a near position is displayed purposely. Accordingly, it is possible to suppress that the image to be displayed is complicated and it is difficult to recognize the image.

In addition, the pattern may be a line which is parallel to a central axis of the car on which the display device is mounted, and may be a line indicating a center or a road shoulder of a road in which the car is traveling. Therefore, the natural pattern is displayed to the user and the uncomfortable feeling to be received by the user can be suppressed.

It is to be noted that these generic or specific aspects may be implemented using a system, a method, an integrated circuit, a computer program, or a non-transitory computer-readable recording medium such as a CD-ROM, and may also be implemented by any combination of systems, methods, integrated circuits, computer programs, or recording media.

The invention claimed is:

1. A display device comprising:
   a display that projects light indicating an image to a display medium with translucency and reflects the light to the display medium to allow a user to visually recognize the image as a virtual image;
   a memory that stores instructions;
   a processor which, when executing the instructions stored in the memory, performs operations comprising:
   performing a first stereoscopic display process for projecting light indicating each of first image for a left eye and a first image for a right eye of a display object on the display such that a stereoscopic view of the display object is displayed to the user in a three-dimensional image space,
   determining whether a display distance, that is a distance from a display standard position of the three-dimensional image space in a depth direction to a position of the display object, is greater than or equal to than a predetermined threshold value,
   performing a second stereoscopic display process with respect to each of a plurality of portions of a pattern in sequential order from a near side toward a far side in the image space, for projecting light indicating each of a second image for a left eye and a second image for a right eye of each portion of the plurality of portions of the pattern, such that a stereoscopic view of the pattern is displayed to the user when it is determined that the display distance is greater than or equal to the threshold value.

2. The display device of claim 1,
   wherein the processor, when executing the instructions stored in the memory, further performs operations comprising:
   performing the second stereoscopic display process with respect to each of the plurality of portions which are continuously disposed in the depth direction.

3. The display device according of claim 1,
   wherein the processor, when executing the instructions stored in the memory, further performs operations comprising:
   performing the second stereoscopic display process with respect to each of the plurality of portions which are intermittently disposed in the depth direction.

4. The display device of claim 1,
   wherein the processor, when executing the instructions stored in the memory, further performs operations comprising:
   performing the first stereoscopic display process such that the display object is viewed smaller with an increase in a distance of a position of the display object in the image space in the depth direction.

5. The display device of claim 1,
   wherein the processor, when executing the instructions stored in the memory, further performs operations comprising:
   performing the first stereoscopic display process such that the position of the display object to be viewed is higher with an increase in a distance of the position of the display object in the image space in the depth direction.

6. The display device of claim 1,
wherein the processor, when executing the instructions stored in the memory, further performs operations comprising:
performing a plan display process for projecting light indicating the same image to left and right eyes to the display so that the user visually recognize a display object for a plan view in the image space, regardless of whether or not the first stereoscopic display process and the second stereoscopic display process are performed.

7. The display device of claim 6,
wherein the display object for a plan view is a meter indicating a state of a car on which the display device is mounted as a numerical value.

8. The display device of claim 1,
wherein the pattern is a line which is parallel to a central axis of the car on which the display device is mounted, or a line indicating a center or a road shoulder of a road in which the car is traveling.

9. A display method using a display that projects light indicating an image to a display medium with translucency and reflects the light to the display medium to allow a user to visually recognize the image as a virtual image, the method comprising:
performing a first stereoscopic display process for projecting light indicating each of a first image for a left eye and first image for a right eye of a display object on the display such that a stereoscopic view of the display object is displayed to the user in a three-dimensional image space;
determining whether a display distance, which is a distance from a display standard position of the three-dimensional image space in a depth direction to a position of the display object, is greater than or equal to a predetermined threshold value; and
performing a second stereoscopic display process with respect to each of a plurality of portions of a pattern in sequential order from a near side toward a far side in the image space, for projecting light indicating each of a second image for a left eye and a second image for a right eye of each portion of the plurality of portions of the pattern, such that a stereoscopic view of the pattern is displayed to the user when it is determined that the display distance is greater than or equal to the threshold value.

* * * * *